Patented Nov. 19, 1946

2,411,142

UNITED STATES PATENT OFFICE 2,411,142

SYNTHETIC FUSIBLE AMINE RESINS AND THE METHOD OF OBTAINING THE SAME

Charles D. Kelso, Crete, Ill., and Chester E. Adams, Highland, Ind., assignors to Standard Oil Company, Chicago, Ill., a corporation of Indiana No Drawing. Application April 30, 1943, Serial No. 485,158

12 Claims. (Cl. 260—2)

This invention relates to improvements in fusible synthetic resins and more particularly relates to fusible synthetic amine resins and to their preparation.

Certain types of difficultly fusible or substantially infusible synthetic resins are obtained by reacting aromatic compounds having at least two haloalkyl groups substituted in the aromatic nucleus with aqueous ammonia at temperatures below about 480° F. preferably at a temperature of from about 140° F. to about 250° F. and under sufficient pressure to maintain the reactants in the liquid phase.

The aromatic component of the reaction is a mono-nucleated or poly-nucleated aromatic compound having at least two active haloalkyl groups preferably chloroalkyl and bromoalkyl groups, substituted in the aromatic nucleus. The haloalkyl substituents are preferably halomethyl groups and more preferably are halomethyl groups in non-adjacent positions in the ring. In addition to the haloalkyl substituents the nucleus may contain other hydrocarbon substituent groups such as alkyl, cyclo alkyl and other aryl groups.

The term "active haloalkyl groups" as employed in the above definition means such haloalkyl groups which are capable of precipitating a silver halide from a silver nitrate solution in the cold;

Representative of the class of aromatic compounds which is employed in the preparation of such resins are the following:

Di(chloromethyl) naphthalenes
Di(chloromethyl) benzenes
Di(bromomethyl) naphthalenes
Di(bromomethyl) benzenes
Di(chloromethyl) toluenes
Di(bromomethyl) toluenes
Di(chloromethyl) mesitylene
a,a'-Dichlorodurenes
a,a'-Dichloroisodurenes
a,a'-Dichloroprehnitene
Di(chloromethyl) methyl naphthalene
Di(chloromethyl) diethylbenzene
Di(bromomethyl) methyl naphthalene
Tri(chloromethyl) naphthalene
Di(chloroethyl) naphthalene and others.

The polyamine synthetic resins are obtained by reacting suitable poly(haloalkyl) aromatic compounds of the above type with aqueous ammonia at room temperature or higher but below about 480° F. and preferably at a temperature within the range of about 140 to about 350° F. and under a pressure sufficient to maintain the reactants in a liquid phase. The reaction time obviously varies with the reaction temperature and may be a matter of minutes to a matter of days. When the reaction is conducted within the preferred range; namely, from about 140° F. to about 350° F., the reaction time varies from about one-half hour to about thirty hours.

The concentration of the aqueous ammonia solution can be varied depending upon the poly (haloalkyl) aromatic compounds used and upon the reaction conditions. However, in any case, the aqueous ammonia solution should be sufficiently concentrated to avoid hydrolysis of the di(haloalkyl) aromatic compound. Since sufficient basic material functioning as an acid acceptor should be used in carrying out the reaction, the ammonia may constitute the sole basic material employed acting both as a reactant and an acid acceptor or other basic compounds such as, for example, basic metallic hydroxides, and oxides, and basic organic compounds such as dimethyl aniline, pyridine or any other organic base free of amino hydrogen may be employed in conjunction therewith. In the absence of another basic material as an acid acceptor, the amount of ammonia used should be in excess of 8 mols of ammonia for each 6 mols of halogen in the aromatic compound employed. When other basic materials are employed as the acid acceptor, the amount of aqueous ammonia employed is correspondingly reduced. Thus, when none of the aqueous ammonia is utilized as the acid acceptor, 2 mols of ammonia is used for each 6 atoms of halogen in the aromatic compound.

While it is preferable to employ aqueous ammonia for the synthesis of these polyamine resins, aqueous solutions of water soluble primary amines, preferably alkyl mono- or polyamines can be used in combination with aqueous ammonia.

In conducting the reaction suitable inert or non-reactive diluents can be employed such as, for example, ether, hexane, dioxane, benzene, toluene and the like.

The following examples are illustrative of the methods of obtaining infusible polyamine resins of the hereindescribed types.

*Example I*

Twenty grams of 2,4-dichlorodurene were reacted at 170° F. with 200 cc. of a concentrated aqueous ammonia solution. Although the reaction mass solidified in one-half hour, the reaction was continued for two hours. After boiling with acetone and water a product yield of 2.5 grams was obtained. The washed material was treated with a hot 5% solution of sodium hydroxide for two hours and an infusible, but moldable resinous material obtained.

*Example II*

Twenty grams of 2,4-dichlorodurene were reacted with 200 cc. of a concentrated aqueous ammonia solution for four hours at 120° F. An additional 100 cc. of aqueous NH₃ were added and the reaction continued for four more hours. The reaction mass was filtered and extracted twice with boiling acetone. A yield of 6.5 grams of a moldable resinous material was obtained.

*Example III*

Five grams of di(chloromethyl) naphthalene were reacted with 200 cc. of a 28% aqueous solution of NH₃ in a shaker bomb at 250° F. to 260° F. for about twenty-one hours. At the end of this time the temperature increased to 335° F., heating was stopped and the reaction products shaken for another hour, making a total reaction time of twenty-two hours.

The bomb was opened and the contents thereof filtered. The solid material was washed with water and dried at 220° F., and a yield of 3.4 grams of solid material obtained. The resinous material was molded with a platen temperature of 450° F. and 8000 pounds per square inch. A molding with a very hard surface was obtained.

*Example IV*

One gram of 1,5-di(chloromethyl) naphthalene and 5 cc. of a 28% aqueous ammonia solution were heated in an oven in a sealed tube at 172° F. for forty hours. The contents of the tube were then removed to a flask and refluxed with 200 cc. of water for two hours. The material was then filtered and dried and a solid material weighing .85 gram was obtained. The material was insoluble in boiling hexane and boiling methyl naphthalene. The resinous material was molded at a platen temperature of 425° F. and 8000 pounds per square inch. The molding obtained was hard with a high polish.

The synthetic resins of the foregoing type, as well as other amine-type resins, while suitable for certain purposes, are in some respects undesirable in that they are substantially infusible at molding temperatures; that is, the softening point of such resins is higher than the usual molding temperatures and hence the material does not fuse to give a desirable transparent or translucent resinous material.

It is the object of the present invention to provide an improved method of lowering the softening point of substantially infusible synthetic resins of the amine type. Another object of the present invention is to provide a method of modifying synthetic amine resins for the purpose of lowering the molding temperature thereof. Still another object of the invention is to provide fusible synthetic amine resins.

We have discovered that the foregoing objects can be attained by treating such resins with a halogenated organic compound, such as an organic halide or an organic acid halide, which is capable of adding to a tertiary amino nitrogen atom to form a quaternary compound. The chlorinated compounds are preferably employed. The treatment is carried out at an elevated temperature, preferably at the molding temperature of the resin, for example at a temperature between about 250° F. and about 475° F. The length of time for the treatment will vary, since it is dependent upon the temperature and the amount of softening agent employed. Suitable compounds are the mono-nucleated or poly-nucleated aromatic compounds having one or more haloalkyl groups substituted in the aromatic nucleus such as, for example, the following representative specific compounds:

Di(chloromethyl) naphthalene
Di(chloromethyl) benzene
Di(bromomethyl) naphthalene
Di(bromomethyl) benzene
Di(chloromethyl) toluene
Di(bromomethyl) toluene
Di(chloromethyl) mesitylene
a,a'-Dichloroprehnitene
a,a'-Dichloroisodurene
a,a'-Dichlorodurene
Benzyl chloride
a-Chloroxylenes
a-Chloromesitylene
a-Cholorotrimethylbenzenes
(Chloromethyl) naphthalene
a-Choloroprehnitene
Di(chloromethyl) methyl naphthalene
Di(chloromethyl) di ethyl benzene
Di(bromomethyl) methyl naphthalene
Di(chloroethyl) naphthalene and others. Other organic halides which are suitable are the hydrocarbon halides such as trimethylene dibromide, ethylene dichloride, amyl chloride, amyl bromide, hexyl chloride, dichloropentane, dichlorobutene, dibromocyclohexane and the like. Organic acid halides such as, for example, acetyl chloride, acetyl bromide, benzoyl chloride, succinyl chloride, benzene sulfone chloride and the like are suitable softening agents. Mixtures of two or more of any of the foregoing types of organic halides can be employed.

In order to clearly set forth the present invention, the same will be described in connection with the modification of the synthetic amine resins of the hereinbefore-described type in which aromatic compounds having at least two active haloalkyl groups substituted in the aromatic nucleus are reacted with aqueous ammonia solutions. It is to be understood, however, that the present invention is not limited to the modification of resins so prepared but is broadly directed to the modification of any substantially infusible synthetic amine resin such as, for example, the synthetic resin of the type described in U. S. Patent 2,268,620 issued to G. W. Rigby January 6, 1942. Accordingly the present invention is illustrated by the following examples:

*Example V*

Twenty grams of 2,4-dichlorodurene were reacted with 200 cc. of a concentrated aqueous ammonia solution for four hours at 120° F. An additional 100 cc. of aqueous ammonia were then added and the reaction continued for four more hours and the reaction mass filtered and twice extracted with boiling acetone. A resinous material was obtained which was incompletely fused when molded at a temperature of 400° F. under a pressure of 16,000 pounds per square inch.

One gram of resinous material was then mixed with .15 gram of 2,4-dichlorodurene and the mixture molded at 400° F. under a pressure of 16,000 pounds per square inch. A completely fused molding was obtained.

Example VI

One hundred forty grams of 2,4-dichlorodurene were reacted with 1000 cc. of a 15% aqueous solution of ammonia at 140° F. for eighteen hours. The solid reaction material was washed with cold water and dried with alcohol and ether. The washed material was then twice extracted with hot benzene, filtered and dried. The resinous material obtained was infusible when molded at 400° F. and under a pressure of 10,000 pounds per square inch.

A portion of the above resinous material was refluxed with a 5% solution of sodium hydroxide for several hours. One hundred parts of this caustic treated resinous material was then mixed with fifteen parts of 2,4-dichlorodurene and the mixture molded at 450° F. under a pressure of 16,000 pounds per square inch. A substantially completely fused molding was obtained.

Example VII

Eleven grams of 1,5 di(chloromethyl) naphthalene and 160 cc. of 14% aqueous NH₃ were reacted for sixteen hours at 130° F. and for six hours at 146° F. The solid product was filtered, refluxed for two hours in 250 cc. of 1% aqueous KOH, filtered, washed with water and dried.

A portion of the resin was molded at 400° F. under 16,000 pounds per square inch for fifteen minutes, the molding obtained being unfused.

To one hundred parts of the resin was added seven parts of benzoyl chloride in hexane solution and the resulting mixture evaporated to remove hexane. On molding the mixture at 400° F. under 16,000 pounds per square inch for fifteen minutes a strong, fused molding resulted.

In the foregoing examples we have demonstrated the softening effect of certain halogenated organic compounds upon difficultly fusible synthetic amine-type resins. Similar results are obtainable by carrying out the reactions in such a manner that not all of the di(haloalkyl) aromatic compound reacts with the ammonia, as illustrated by the following example:

Example VIII

One hundred forty grams of 2,4-dichlorodurene and 1000 cc. of 14% aqueous ammonia were heated at 140° F. with stirring for 24 hours. The reaction temperature was raised to 175° F. and held for seven hours under atmospheric pressure. The product was filtered, washed with water and divided into two parts. One portion was dried and molded at 450° F. and 16,000 pounds per square inch, yielding a fused, transparent molding. The second portion was extracted with boiling benzene, approximately 10% of the weight of the resin being removed. A substantial portion of this extract was identified as unchanged 2,4-dichlorodurene. The benzene insoluble resin when molded at 450° F. and 16,000 pounds per square inch gave a chalky unfused molding.

In Example VIII we impart fusible properties by leaving in the product unreacted di(haloalkyl) aromatic, the amount being left in the resin depending upon the desired softening temperature. For example, at different times as the reaction progresses samples of the reacted material are examined to determine the amount of di(haloalkyl) aromatic and the fusibility of the product, and the reaction of the main body of the material is allowed to proceed until the desired residue of unreacted di(haloalkyl) aromatic is obtained. Obviously not only the time factor will determine the completeness of the reaction between the aqueous ammonia and the di(haloalkyl) aromatic but also the temperature, strength of aqueous ammonia and the available amount of ammonia for the reaction.

In softening infusible amine resins with halogenated organic compound it is essential to avoid the use of an excessive amount of the latter since the use of too great a quantity of the softening material will lower the softening point of the resin to a degree which will render the resin brittle.

Since many embodiments of this invention may be made without departing from the spirit and scope thereof, it is to be understood that the invention is not limited to the specific examples and embodiments described herein, except as defined in the appended claims.

We claim:

1. As a new composition of matter a fusible synthetic amine resin obtained by the process comprising reacting in the liquid phase a di(chloromethyl) naphthalene with aqueous ammonia sufficiently concentrated to avoid hydrolysis of the di(chloromethyl) naphthalene, and at least one-third mol of ammonia being used for each chlorine atom in the di(chloromethyl) naphthalene and heating the resultant amine resin at a temperature of from about 250° F. to about 475° F. with a hydrocarbon halide containing not more than two halogen atoms in the molecule, and wherein the halogen atoms are attached to aliphatic carbon atoms, said hydrocarbon halide being capable of adding to a tertiary amino nitrogen atom.

2. As a new composition of matter a fusible synthetic amine resin obtained by the process comprising reacting in the liquid phase a di(chloromethyl) xylene with aqueous ammonia sufficiently concentrated to avoid hydrolysis of the di(chloromethyl) xylene, and at least one-third mol of ammonia being used for each chlorine atom of the di(chloromethyl) xylene and heating the resultant amine resin at a temperature of from about 250° F. to about 475° F. with a hydrocarbon halide containing not more than two halogen atoms in the molecule, and wherein the halogen atoms are attached to aliphatic carbon atoms, said hydrocarbon halide being capable of adding to a tertiary amino nitrogen atom.

3. The method of lowering the softening point of difficultly fusible synthetic amine resins obtained by reacting in the liquid phase concentrated aqueous ammonia with an aromatic hydrocarbon having at least two active haloalkyl groups capable of precipitating a silver halide from a silver nitrate solution in the cold substituted in the aromatic nucleus, said aqueous ammonia being sufficiently concentrated to avoid hydrolysis of the aromatic hydrocarbon and at least two mols of ammonia being used for each six atoms of halogen in the aromatic hydrocarbons, comprising heating said resin at a temperature of from about 250° F. to about 475° F. with a halogenated organic compound capable of adding to a tertiary amino nitrogen atom selected from the group consisting of a hydrocarbon halide containing not more than two halogen atoms in the molecule, and wherein the halogen atoms are attached to aliphatic carbon atoms and an organic acid halide containing not more than two acyl halide groups attached to a hydrocarbon residue.

4. The method described in claim 3 in which the aromatic hydrocarbon is a poly(haloalkyl)

poly-nuclear aromatic hydrocarbon having at least two active haloalkyl groups, capable of precipitating a silver halide from a silver nitrate solution in the cold, substituted in the aromatic nucleus.

5. The method described in claim 3 in which the aromatic hydrocarbon is a poly(haloalkyl) mono-nuclear aromatic hydrocarbon having at least two active haloalkyl groups, capable of precipitating a silver halide from a silver nitrate solution in the cold, substituted in the aromatic nucleus.

6. The method described in claim 3 in which the aromatic hydrocarbon is a poly(chloromethylated) aromatic hydrocarbon having at least two chloromethyl groups capable of precipitating a silver halide from a silver nitrate solution in the cold, substituted in the aromatic nucleus.

7. The method described in claim 3 in which the aromatic hydrocarbon is a di(chloromethyl) naphthalene.

8. The method described in claim 3 in which the aromatic hydrocarbon is a di(chloromethyl) xylene.

9. The method described in claim 3 in which the aromatic hydrocarbon is a di(chloroalkyl) aromatic hydrocarbon, said di(chloroalkyl) groups being capable of precipitating a silver halide from a silver nitrate solution in the cold and the halogenated organic compound is a mono(chloroalkyl) aromatic hydrocarbon.

10. The method described in claim 3 in which the aromatic hydrocarbon is a di(chloroalkyl) aromatic hydrocarbon, said di(chloroalkyl) groups being capable of precipitating a silver halide from a silver nitrate solution in the cold and the halogenated organic compound is a di(chloroalkyl) aromatic hydrocarbon.

11. As a new composition of matter the synthetic fusible amine resin obtained by the process of claim 3.

12. The method of lowering the softening point of difficultly fusible synthetic amine resins obtained by reacting in the liquid phase concentrated aqueous ammonia with an aromatic hydrocarbon having at least two active haloalkyl groups capable of precipitating the silver halide from a silver nitrate solution in the cold substituted in the aromatic nucleus, said aqueous ammonia being sufficiently concentrated to avoid hydrolysis of the aromatic hydrocarbon and at least two mols of ammonia being used for each six atoms of halogen in the aromatic hydrocarbon, comprising mixing said resin with a hydrocarbon halide containing not more than two halogen atoms in the molecule, and wherein the halogen atoms are attached to aliphatic carbon atoms, said hydrocarbon halide being capable of adding to a tertiary amino nitrogen atom, and heating the mixture to a temperature of from about 250° F. to about 475° F.

CHARLES D. KELSO.
CHESTER E. ADAMS.